United States Patent
Goldberg et al.

(10) Patent No.: US 6,327,657 B1
(45) Date of Patent: Dec. 4, 2001

(54) METHOD AND APPARATUS FOR CREATING ELECTRONIC WATER MARKS IN DIGITAL DATA

(75) Inventors: Randy G. Goldberg, Princeton; Richard M. Sachs, Middletown; William R. Wetzel, Little Silver, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/074,223

(22) Filed: May 7, 1998

(51) Int. Cl.$^7$ ...................................... H01L 9/00
(52) U.S. Cl. ............................................. 713/176
(58) Field of Search .............................. 713/176

(56) References Cited

U.S. PATENT DOCUMENTS

| | | | |
|---|---|---|---|
| 5,020,135 | * 5/1991 | Kasparian et al. | 455/76 |
| 5,646,997 | 7/1997 | Barton | 380/23 |
| 5,687,191 | 11/1997 | Lee et al. | 375/216 |
| 5,687,236 | 11/1997 | Moskowitz et al. | 380/28 |
| 5,706,392 | 1/1998 | Goldberg | 364/514 B |
| 5,727,092 | 3/1998 | Sandford et al. | 382/251 |
| 5,742,771 | * 4/1998 | Fontaine | 709/225 |
| 5,809,139 | * 9/1998 | Girod et al. | 380/5 |
| 5,892,900 | * 4/1999 | Ginter et al. | 713/200 |
| 6,115,395 | * 9/2000 | Norrell et al. | 370/523 |

* cited by examiner

*Primary Examiner*—Gail Hayes
*Assistant Examiner*—Douglas J Meislahn
(74) *Attorney, Agent, or Firm*—Kenyon & Kenyon

(57) ABSTRACT

The present invention relates to a method and apparatus for placing a message in digital data. The message is placed by manipulating certain data bits in a way that does not severely corrupt the data. The data can be mu-law encoded, wherein a value of 1 is assigned to one representation of zero, and a value of 0 is assigned to the other representation of zero. In this case, a message is placed in the data using these assigned values of 1 and 0.

9 Claims, 5 Drawing Sheets

METHOD AND APPARATUS FOR CREATING ELECTRONIC WATER MARKS IN DIGITAL DATA

FIELD OF THE INVENTION

The present invention relates to protecting digital audio data against unauthorized copying. More particularly, the present invention relates to ways of marking digital audio data by manipulating bit patterns without significantly altering information that the data is meant to carry.

BACKGROUND OF THE INVENTION

To protect valuable audio data, it is often desirable to mark the data in an identifiable way. For example, if an owner of digital data desires to protect digital data against copyright infringement, the owner needs some way of showing that the data does, in fact, belong to the owner. The owner can prove ownership, inter alia, by marking the data in a known way. This is called "water marking" the data.

Marking the data in a practical way, however, is difficult, particularly because if the data is labeled using a trivial marking procedure, an infringer can easily strip off or change the mark. Furthermore, marking data by inserting or manipulating data bits corrupts the data in ways that may make the data unsuitable for its intended use.

Any analog value can be represented as a series of numbers, or digitally, and there are various formats used to represent digital data. For example, in Pulse Code Modulated (PCM) data, the arrangement of the bits is such that some bits are more important than others, ranging in importance from the most significant bit to the least significant bit. If the most significant bit is changed, the data is going to be severely corrupted, perhaps to the point where the data is unsuitable for its intended purpose. But if the least significant bit is changed, the smallest amount of corruption will result. Also, less corruption occurs if not every least significant bit is altered. For example, if every tenth least significant bit is altered, an effect is produced that is less noticeable than if every significant bit is altered. Nevertheless, altering bits in this way to water mark data can produce perceptually-intrusive results.

Another format used for digital data is called differential encoding. An example of this is Adaptive Differential Pulse Code Modulation (ADPCM). This format is selected for various types of audio data because sometimes the differential aspect of coding is desirable: one encodes not the absolute value of the sonic pressure wave, but rather the difference from one sample to the next. Because speech, for example, normally changes in small increments, the difference from one sample to the next is smaller than the absolute size of the waves. Therefore, less data is needed if only the differences are encoded. The trouble with water marking the data by encoding the difference is that values are dependent on the previously received signal; if one changes a value earlier in time, every subsequent differential value will be affected.

SUMMARY OF THE INVENTION

The present invention introduces systems and methods for marking audio data in a way that is difficult to detect without significantly corrupting the data. In particular, for audio data, the present invention does not corrupt the data in an audiologically-detectable way. In one embodiment of the present invention, digital audio data and a message are received to be encoded into the data. Once the digital audio data is received, a frequency analysis can be performed producing a spectral output for each piece of data. An auditory analysis is performed on the spectral output data to identify segments of data that are inaudible to the human auditory system, and a message is placed into the inaudible segments of the output data.

In another embodiment of the present invention, data is formatted with a scheme that uses more than one representation for a number or symbol. For example, mu-law-encoded data allows for two representations of the value zero. One may place a message in this data if the value zero is signified by the two representations in some predictable way.

DETAILED DESCRIPTION

The present invention is directed to a method and apparatus for encoding a message into digital data.

Figure 1:
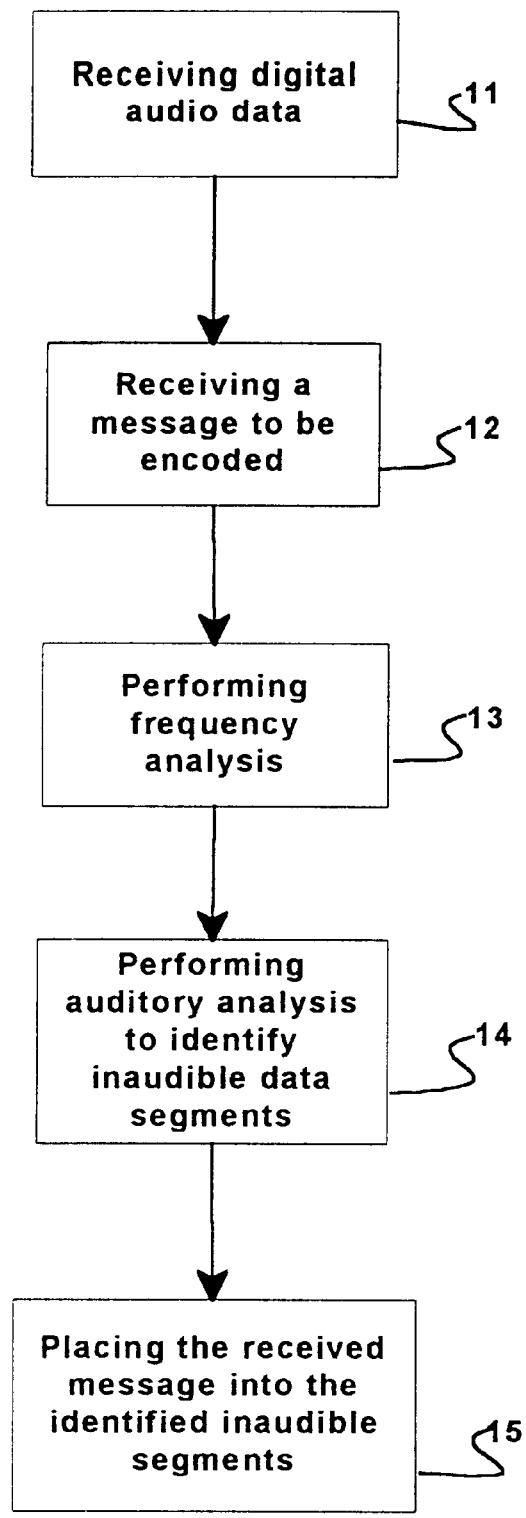
FIG. 1 is a flow chart of a method according to an embodiment of the present invention.

Referring now in detail to the drawings, FIG. 1 illustrates an embodiment of a method in accordance with the present invention. First, digital audio data is received for water marking at step 11. For the purposes of this invention, the word "received" includes, but is not limited to, "creates" and "selects." At step 12, a message is received to be encoded in the digital audio data. For example, a simple ASCII message such as "COPYRIGHT 1997 AT&T CORP." may be received to be inserted into the data. A frequency analysis is performed on the received digital audio data at step 13, and at step 14, an auditory analysis is performed based on the results of the frequency analysis. This analysis at step 14 is performed to determine those bits of data that do not contain audiologically-detectable data. Once this analysis is performed, the received message is placed encoded into this inaudible data at step 15.

The analysis at steps 13 and 14 is performed pursuant to a method discussed in U.S. Pat. No. 5,706,392, entitled Perceptual Speech Coder and Method (hereinafter "Goldberg"). This patent discloses that, with regard to audio data, there are various ways of determining those bits which, if varied, will provide the least perceptual intrusion. That patent is hereby incorporated by reference into this application. The perceptual speech coder in the Goldberg patent operates by first filtering, sampling, and digitizing an analog speech input signal. Each frame of the digital speech signal is passed through a multi-band excitation (MBE) coder for obtaining a fundamental frequency, complex magnitude information, and V/UV bits. This information is then passed through an auditory analysis module, which examines each frame from the MBE coder to determine whether certain segments of each frame are inaudible to the human auditory system due to simultaneous or temporal masking. In one embodiment of the present invention, the message received at step 12 is encoded in the inaudible segments of each frame.

It should be appreciated that the steps displayed in FIG. 1 may be performed in any order that is practicable.

Figure 2:
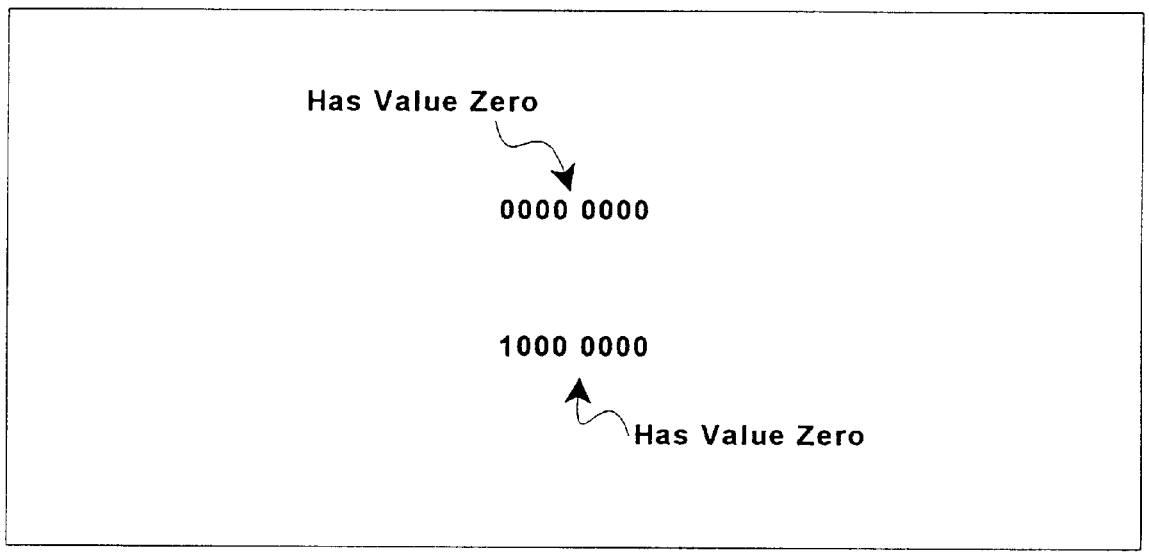
FIG. 2 is a representation of two values of zero in a typical mu-law encoded bit pattern.

FIG. 2 is a representation of the value "zero" in mu-law encoded data. Typically, 12 bits or more are needed to represent, with reasonable fidelity, an acoustic wave. Using a compression technique called mu-law encoding can reduce this amount to 8 bits. Mu-law encoding applies a roughly logarithmic function to the signal such that the quantization error is a constant percentage of the amplitude, using a non-linear compression of the amplitude. In mu-law encoded data, there are two numerical representations of the value zero—0000 0000 and 1000 0000. In practice, only one number is used to represent this value, while the other number is left unused.

Figure 3:
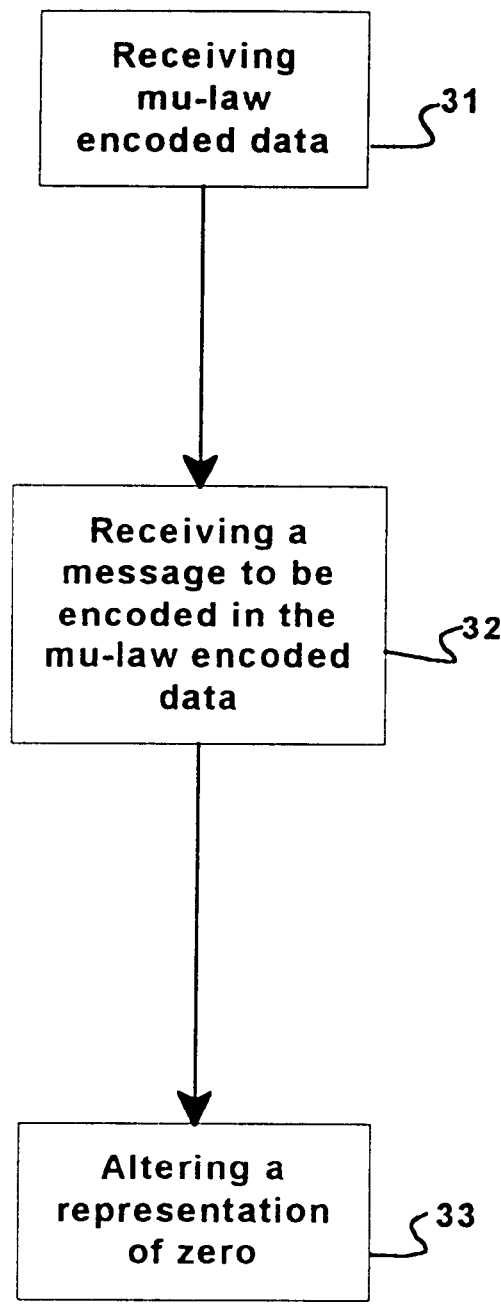
FIG. 3 is a flow chart of a method according to an embodiment of the present invention.

FIG. 3 is a flow chart of a method according to the present invention using this property of mu-law encoding. At step 31, mu-law encoded digital data is received for water marking. At step 32, a message is received to be placed in the data, and at step 33 the message is placed in the data by altering one of the multiple representations of a known value. For mu-law-encoded data, the message is placed in the data at step 33 by manipulating a representation of the value zero in some known way.

In one embodiment of the present invention, the encoding scheme defines one value of zero, say the number 1000 0000, in this scheme to represent a 1, while the other value of zero, the number 0000 0000, will represent zero. Now, at step 33, one places the message in the data by setting the two values of zero to represent either a 1 or a zero in such a way as to create a message. In this way, bits of information can be encoded into the mu-law data without disrupting, for example, audio quality, because a listener can not hear the difference between the two representations of the value zero. Because the value of the number has not changed, the data is not corrupted in a detectable way. In one embodiment of the present invention, the message is hidden by pseudorandomly altering the representation of the value zero around the message. The message can then be displayed by any person or device that knows where the message is and how it is placed in the data.

It should be recognized that mu-law encoded data is used as a context for discussing an embodiment of the present invention, but the invention is not limited to mu-law encoded data; any data is suitable in certain embodiments of the present invention as long as the formatting technique for that data uses more than one representation for a known value. For purposes of the present invention, mu-law encoded data is shorthand for any data that uses more than one representation for a known value.

Figure 4:
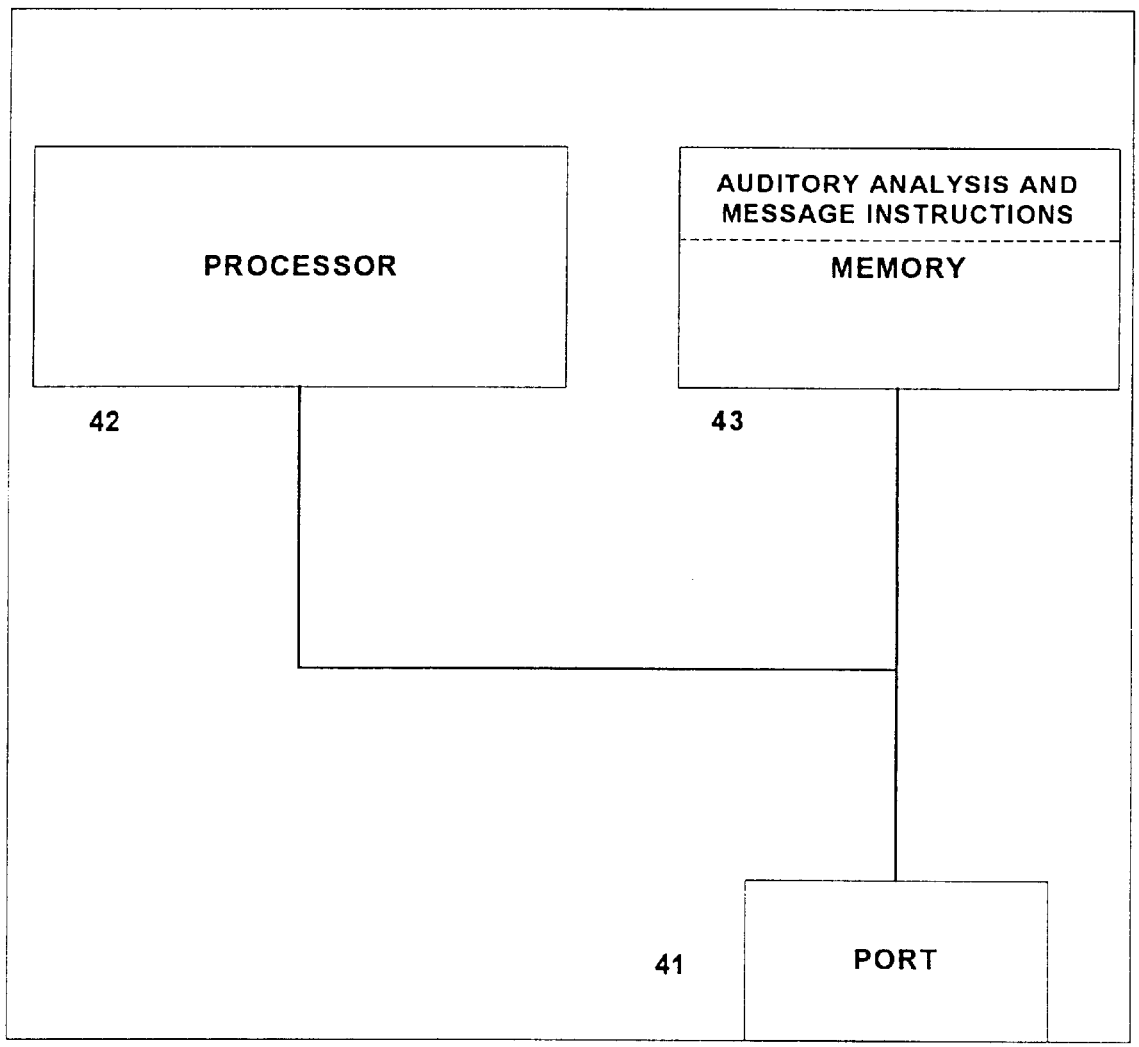
FIG. 4 is a diagram of an apparatus according to an embodiment of the present invention.

FIG. 4 is a diagram of an apparatus according to an embodiment of the present invention. The apparatus consists of port 41 through which digital data in some format is received, processor 42, and memory 43. Memory 43 stores instructions adapted to be executed on the processor to receive digital data to be water marked, to receive a message to be placed in the digital data, to perform frequency analysis and auditory analysis, and then to place the received message into the inaudible data segments.

For the purposes of this application, memory includes any medium capable of storing instructions adapted to be executed by a processor. Some examples of such media include, but are not limited to, floppy disks, CDROM, magnetic tape, and hard drives. As used herein, the phrase "adapted to be executed by a processor" is meant to encompass instructions stored in a compressed and/or encrypted format, as well as instructions that have to be compiled or installed by an installer before being executed by the processor.

The present invention also encompasses embodiments of a computer-readable medium (independent of a processor or port) that stores instructions adapted to be executed by a processor to perform embodiments of the method of the present invention. Examples of such a computer-readable medium include the examples of memory discussed above.

Figure 5:
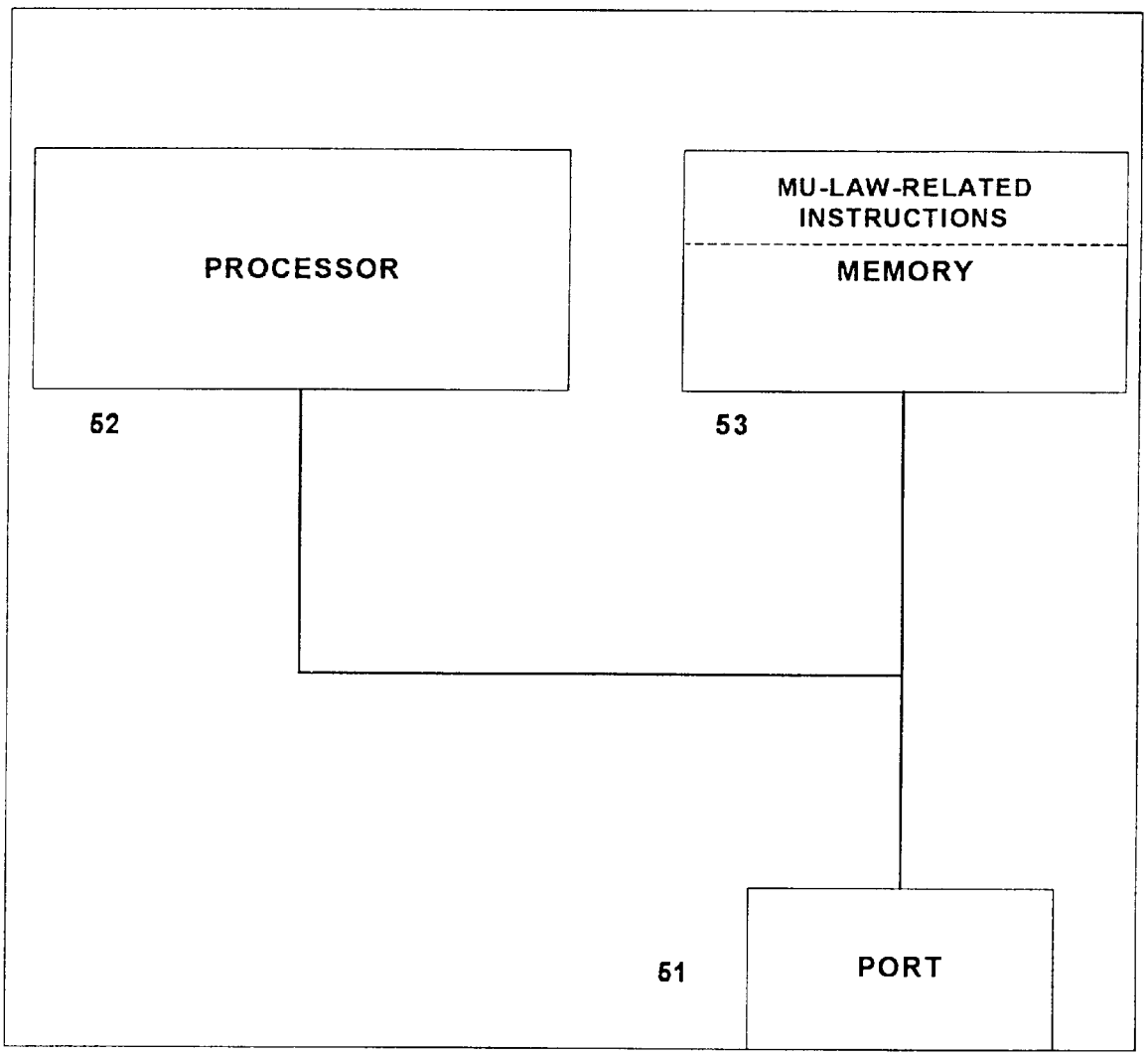
FIG. 5 is a diagram of another apparatus according to an embodiment of the present invention.

FIG. 5 is a diagram of an apparatus according to an embodiment of the present invention. The apparatus consists of port 51 through which digital data in some format is received, processor 52, and memory 53. Memory 53 stores instructions adapted to be executed on the processor to receive digital data to be water marked; to receive a message to be placed in the digital data, and to alter one of the multiple representations of a known value. For mu-law-encoded data, the message is placed in the data at step 53 by manipulating a representation of the value zero in some known way.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of placing a message in mu law encoded digital data, comprising:
    (a) receiving digital data that is encoded with a technique that contains at least two representations of zero;
    (b) receiving a message to be encoded in the digital data; and
    (c) altering at least one representation of zero in a predictable way to encode the message within the digital data.

2. The method of claim 1, wherein the digital data is mu-law encoded, and further comprising:
    (d) pseudorandomly altering at least one representation of zero.

3. The method of claim 1, wherein the digital data is mu-law encoded, and further comprising:
    (d) assigning a value 1 to one representation of zero;
    (e) assigning a value 0 to the other representation of zero; and
    (f) placing a messasge in the data using the assigned value 1 and the assigned value 0.

4. An apparatus for placing a message in mu law encoded digital data, comprising:
    (a) a processor;
    (b) a port coupled to said processor;
    (c) a memory coupled to said processor storing instructions adapted to be executed by said processor to
        (i) receive digital data that is encoded with a technique that contains at least two representations of zero;
        (ii) receive a message to be encoded in the digital data;
        (iii) manipulate at least one representation of zero in a predictable way to encode the message within the digital data.

5. The apparatus in claim 4, wherein the received digital data in step (c)(i) is mu-law encoded data, and further comprising:
    (d) a memory coupled to said processor storing instructions adapted to be executed by said processor to
        (i) pseudorandomly alter the representations of zero.

6. The apparatus in claim 4, wherein the received digital data in step (c)(i) is mu-law encoded data, and further comprising:

(d) a memory coupled to said processor storing instructions adapted to be executed by said processor to
   (i) assigning a value 1 to one representation of zero;
   (ii) assigning a value 0 to the other representation of zero; and
   (iii) placing a message in the data using the assigned value 1 and the assigned value 0.

7. A computer-readable medium that stores instructions adapted to be executed by a processor to perform the steps of:

(a) receiving digital data that is encoded with a technique that contains at least two representations of zero;

(b) receiving a message to be encoded in the digital data;

(c) manipulating at least one representation of zero in a predictable way to encode the message within the digital data.

8. The computer-readable medium of claim 7, wherein the digital data is mu-law encoded, and further storing instructions to be executed by a processor to perform the step of:

(d) pseudorandomly altering the representations of zero.

9. The computer-readable medium of claim 7, wherein the digital data is mu-law encoded, and further storing instructions to be executed by a processor to perform the steps of:

(d) assigning a value 1 to one representation of zero;

(e) assigning a value 0 to the other representation of zero; and (f) placing a message in the data using the assigned value 1 and the assigned value 0.

* * * * *